United States Patent [19]

Yamada

[11] Patent Number: 5,227,102
[45] Date of Patent: Jul. 13, 1993

[54] METHOD OF MANUFACTURING CONDUCTIVE POROUS CERAMIC TUBE

[75] Inventor: Hirotake Yamada, Nagoya, Japan

[73] Assignee: NGK Insulators, Ltd., Japan

[21] Appl. No.: 759,628

[22] Filed: Sep. 16, 1991

Related U.S. Application Data

[63] Continuation of Ser. No. 516,919, Apr. 30, 1991, abandoned.

[30] Foreign Application Priority Data

Apr. 28, 1989 [JP] Japan ................... 1-110813

[51] Int. Cl.$^5$ .................. B29C 65/00; C04B 35/00
[52] U.S. Cl. ...................... 264/44; 264/56; 264/63; 264/104
[58] Field of Search ................ 264/43, 44, 63, 66, 264/104; 429/31, 33; 501/152

[56] References Cited

U.S. PATENT DOCUMENTS

| | | | |
|---|---|---|---|
| 3,957,952 | 5/1976 | Naber et al. | 252/190 |
| 4,707,311 | 11/1987 | Okazaki | 264/44 |
| 4,751,152 | 6/1988 | Zymboly | 429/31 |
| 4,927,577 | 5/1990 | Ohtaka et al. | 264/63 |

FOREIGN PATENT DOCUMENTS

| | | |
|---|---|---|
| 0143325 | 6/1985 | European Pat. Off. . |
| 0194374 | 9/1986 | European Pat. Off. . |
| 0286360 | 10/1988 | European Pat. Off. . |

OTHER PUBLICATIONS

"The Effect of Water Adsorption on ($La_{1-x}Sr_x$)$MnO_3(0.1 \leq x \leq 0.5)$", Yogyo-Kyokai-Shi 88 [9] 1980, H. Taguchi et al., pp. 566-570.

Primary Examiner—Jan H. Silbaugh
Assistant Examiner—Christopher A. Fiorilla
Attorney, Agent, or Firm—Parkhurst, Wendel & Rossi

[57] ABSTRACT

A method of manufacturing a conductive porous ceramic tube including the steps of mixing a powder of La or a La compound, Mn or a Mn compound and Sr or a Sr compound; firing the resulting mixture at a temperature of 1000°–1400° C. and synthesizing the compound of $La_{1-x}Sr_xMnO_3$ (where $0 < x \leq 0.5$); grinding the compound of $La_{1-x}Sr_xMnO_3$ to form a powder of 2 to 10 μm in a mean particle diameter; kneading 100 parts by weight of the powder with the addition of an organic binder, water and 1 to 8 parts by weight of a pore-forming agent; forming the kneaded material into a molded tube; drying the molded tube and thereafter firing the molded tube; at a temperature of 1300°–1600° C.

9 Claims, 4 Drawing Sheets

FIG_3

METHOD OF MANUFACTURING CONDUCTIVE POROUS CERAMIC TUBE

This is a continuation of application Ser. No. 07/516,919 filed Apr. 30, 1991, now abandoned.

BACKGROUND OF THE INVENTION

1. Field of the Invention

The present invention relates to a method of manufacturing a conductive porous ceramic tube.

2. Related Art Statement

A porous ceramic tube having conductivity according to the invention is particularly useful as a component of a solid oxide fuel cell (hereinafter referred to as "SOFC").

The solid oxide fuel cell has recently attracted attention as an extremely favorable generator device having such characteristics that power generating efficiency is high, fuel can be diversified such as naphtha, natural gas, methanol, coal reformed gas and the like, and pollution is low.

In this solid oxide fuel cell, a thin film electrode and an electrolyte as main components have no self-supporting strength, and are therefore formed on a porous support by spray coating, slurry coating and the like.

In case of forming an electrode and an electrolyte on a porous support as described above, however, there is a problem of lowering output by gas diffusion resistance of the support, and the whole construction is complicated.

Therefore, if a porous electrode itself can be used as a support instead of an electrode provided on a porous support, it is possible to simplify the whole construction, to reduce a manufacturing process, to reduce cost, and to improve the output by eliminating any loss caused by gas diffusion resistance.

However, the prior porous electrode cannot obtain sufficient strength by itself and is not suitable as a structural support material.

SUMMARY OF THE INVENTION

An object of the invention is to provide a method of manufacturing a conductive porous ceramic tube which is stronger than before, is usable as an electrode and a support of an electrolyte, and is excellent as a structural material.

The invention relates to a method of manufacturing a conductive porous ceramic tube comprising the steps of mixing La a La compound, Mn a Mn compound and Sr or a Sr compound; firing the resulting mixture at a temperature of $1000°-1400°$ C. and synthesizing $La_{1-x}Sr_xMnO_3$ (where $0 < x \leq 0.5$); grinding the $La_{1-x}Sr_xMnO_3$ to form a powder of 2 to 10 $\mu$m in mean particle diameter; knead 100 parts by weight of the powder with the addition of an organic binder, water and 1 to 8 parts by weight of a pore-forming agent; forming the kneaded material into a molded tube; drying the thus molded tube; and thereafter firing the molded tube at a temperature of $1300°-1600°$ C.

DESCRIPTION OF THE PREFERRED EMBODIMENTS

Figure 1:
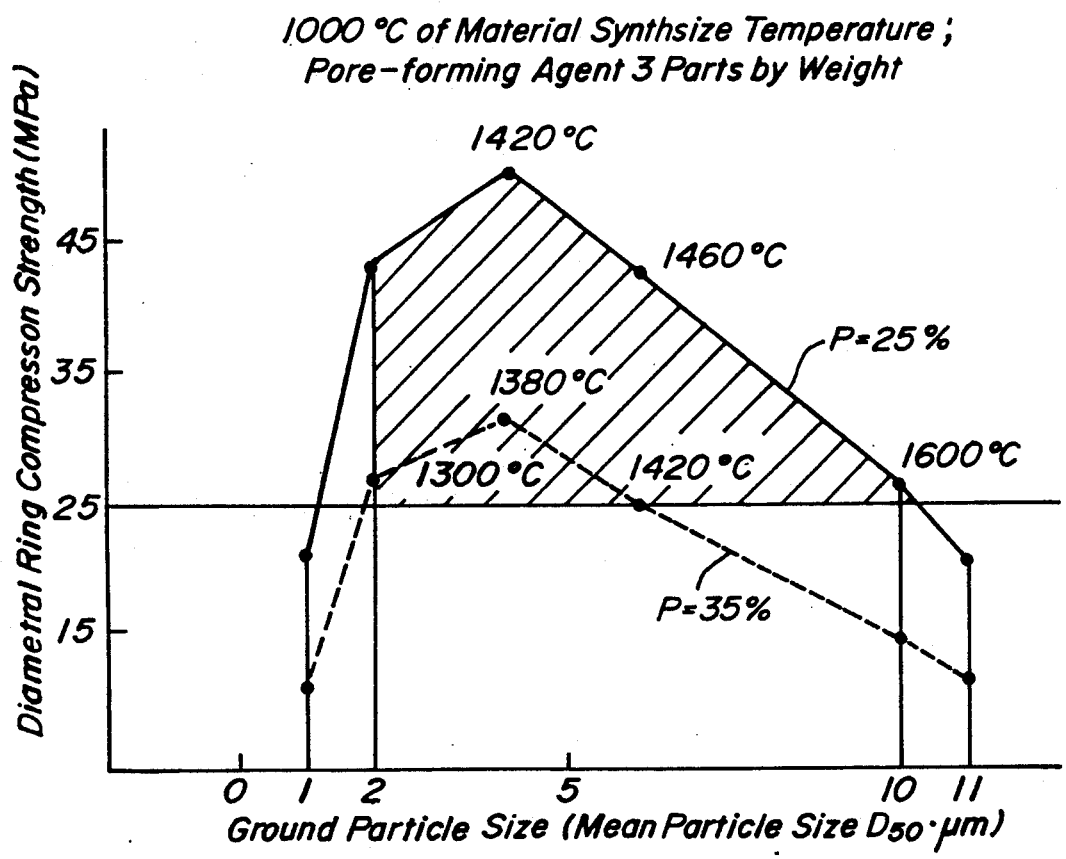
FIGS. 1, 2 and 3 are graphs showing relationships between each manufacturing parameter and diametral ring compression strength, respectively.

First, in case of firing a mixture of La or a La compound, Mn or a Mn compound and Sr or a Sr compound and synthesizing $La_{1-x}Sr_xMnO_3$ (where $0 < x \leq 0.5$), a firing temperature is $1000°-1400°$ C. In case of manufacturing a conductive porous ceramic tube having a predetermined porosity by suitably setting a particle diameter of $La_{1-x}Sr_xMnO_3$, an addition amount of a pore-forming agent and a firing temperature of a molded tube, the strength of said porous ceramic tube is influenced by a synthesizing temperature ($1000°-1400°$ C.) of said $La_{1-x}Sr_xMnO_3$. When $La_{1-x}Sr_xMnO_3$ synthesized at a low temperature region close to $1000°$ C. is used, the porous ceramic tube is improved in strength. It means that the more $La_{1-x}Sr_xMnO_3$ is synthesized at a low temperature, the more excellent the sinterability. Therefore, if $La_{1-x}Sr_xMnO_3$ synthesized at a temperature beyond $1400°$ C. is used, it is impossible to obtain the above porous ceramic tube having sufficient strength. Moreover, if a temperature is not more than $1000°$ C., $La_{1-x}Sr_xMnO_3$ cannot be synthesized.

A synthetic reaction temperature of the material $La_{1-x}Sr_xMnO_3$ is more preferably $1000°-1200°$ C.

Moreover, in case of grinding $La_{1-x}Sr_xMnO_3$, it is important that the mean particle diameter of the powder is 2 to 10 $\mu$m.

That is, at the time of grinding, an uniformity of pore distribution of the porous ceramic tube can be maintained when the powder is divided as finely as possible, and a strength of the porous ceramic tube can finally be made stronger. However, when the mean particle diameter is made less than 2 $\mu$m, the porous ceramic tube becomes low in porosity and a predetermined porosity of more than 25% cannot be obtained. Even if an additional amount of a pore-forming agent is increased, pore distribution of the porous ceramic tube tends to be non-uniform, and if a firing temperature of a molded tube is lowered, the porous ceramic tube is increased in porosity, but insufficient in strength. Moreover, when the mean particle diameter exceeds 10 $\mu$m, the strength becomes insufficient.

It is further important to add 1-8 parts by weight of a pore-forming agent represented by acryl powder, carbon powder and the like which disappears at a low temperature to 100 parts by weight of the powder $La_{1-x}Sr_xMnO_3$.

When the additional amount of a pore-forming agent is not more than 1 part by weight, the porous ceramic tube obtained is highly densified. Therefore, in order to obtain the porous ceramic tube having a predetermined porosity, it is necessary to fire a molded tube at a low temperature with not more than 1 part by weight of a pore-forming agent, and as a result, a predetermined strength cannot be obtained. On the contrary, when the additional amount of a pore-forming agent exceeds 8 parts by weight, pore distribution of the porous ceramic tube obtained becomes non-uniform, and mechanical strength is lowered. Therefore, the additional amount of a pore-forming agent should be 1-8 parts by weight.

It is further important to fire a molded tube at a temperature of $1300°-1600°$ C. If this firing temperature is not more than $1300°$ C., sintering is not completely finished, and the strength of the tube is lowered. When a molded tube is fired at a higher temperature than $1600°$ C., the obtained porous ceramic tube becomes too dense so as not to obtain a predetermined permeability. Even if the additional amount of a pore-forming agent is increased, pore distribution of a porous ceramic tube obtained is liable to be uneven, and such porous ceramic tube is not suitably used for a fuel cell electrode. Thus the firing temperature is preferably 1350°-1450° C.

Moreover, in case of using this porous ceramic tube as an SOFC air electrode, it is necessary that a coefficient of thermal expansion of the porous ceramic tube should approximate that of the solid electrolyte within the allowable range. Therefore, $x \leq 0.5$ is required.

First of all, an example of manufacturing an air electrode tube for a SOFC according to the invention will be described below.

EXAMPLE 1

Powders of $La_2O_3$, $Mn_3O_4$ and $SrCO_3$ were mixed at a weight ratio of 61.7:32.1:6.2 in a ball mill, the mixture was dried and thereafter fired at 1000° C., and $La_{0.9}Sr_{0.1}MnO_3$ was synthesized. Thereafter, the synthesized compound of $La_{0.9}Sr_{0.1}MnO_3$ powder was ground in a ball mill to a mean particle diameter of 1 $\mu m$–11 $\mu m$. To 100 parts by weight of this powder were added 3 parts by weight of cellulose as a pore-forming agent and PVA as an organic binder. The mixture of materials was then kneaded with the addition of 18 parts by weight of water, and formed, by extrusion, into a cylinder of 20 mm in outer diameter, 300 mm in length and 2 mm in thickness. Thereafter, the cylinder was subject to moisture-conditioning and dried, and then fired to make the porosity of each porous ceramic tube 25% or 35% at each firing temperature as shown in FIG. 1. A diametral ring compression strength (n=8) of each example was measured by a method shown in FIG. 4. The results are shown in FIG. 1.

Figure 4:
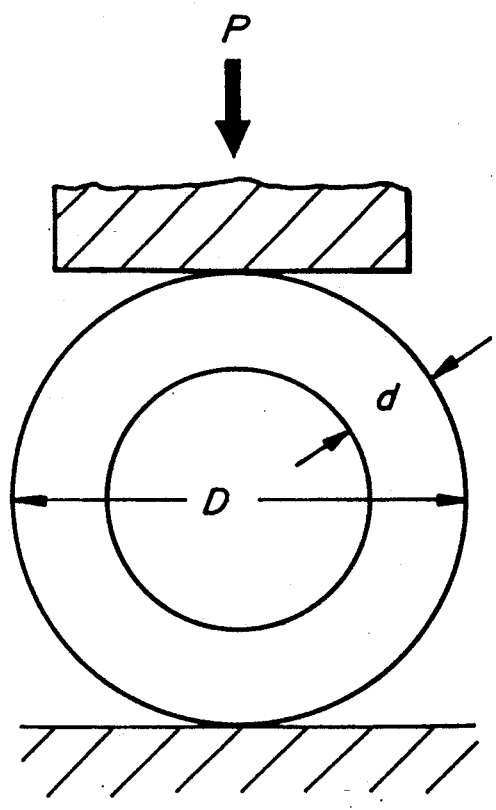
FIG. 4 is an outline drawing for explaining a method of measuring diametral ring compression strength.

In addition, in FIG. 4, P is the maximum load at breaking, D is the outer diameter of a test piece, and d is the thickness of a test piece. Moreover, a sample length is L. Diametral ring compression strength $\sigma_r$ is calculated from the following equation.

$$\sigma_r = \frac{P(D-d)}{Ld^2}$$

Here, the cylindrical air electrode should permeate oxygen efficiently. Therefore, the porosity P should be more than 25%. Moreover, this cylindrical air electrode functions as a support of the whole structure of SOFC, so that diametral ring compression strength should exceed 25 MPa, which is the target strength.

In FIG. 1, a sintering temperature of a molded tube varies and the diametral ring compression strength obtained varies in accordance with the particle diameter of a $La_{1-x}Sr_xMnO_3$ powder used in case of manufacturing a conductive porous ceramic tube by firing a molded tube. In case of manufacturing the porous ceramic tube by using $La_{1-x}Sr_xMnO_3$ powders having the same mean particle diameter, the more the molded tube is fired at high temperature, the more the porosity of the ceramic tube is lowered, and the strength is increased. Moreover, in case of manufacturing porous ceramic tubes having the same porosity, such as P=25%, the smaller the mean particle diameter of $La_{1-x}Sr_xMnO_3$ powder, the lower the sintering temperature. In order to manufacture a conductive porous ceramic tube having more than 25% porosity and diametral ring compression strength of more than 25 MPa, it is preferable to manufacture a porous ceramic tube under the condition within a range shown by the oblique line in FIG. 1.

EXAMPLE 2

Figure 2:
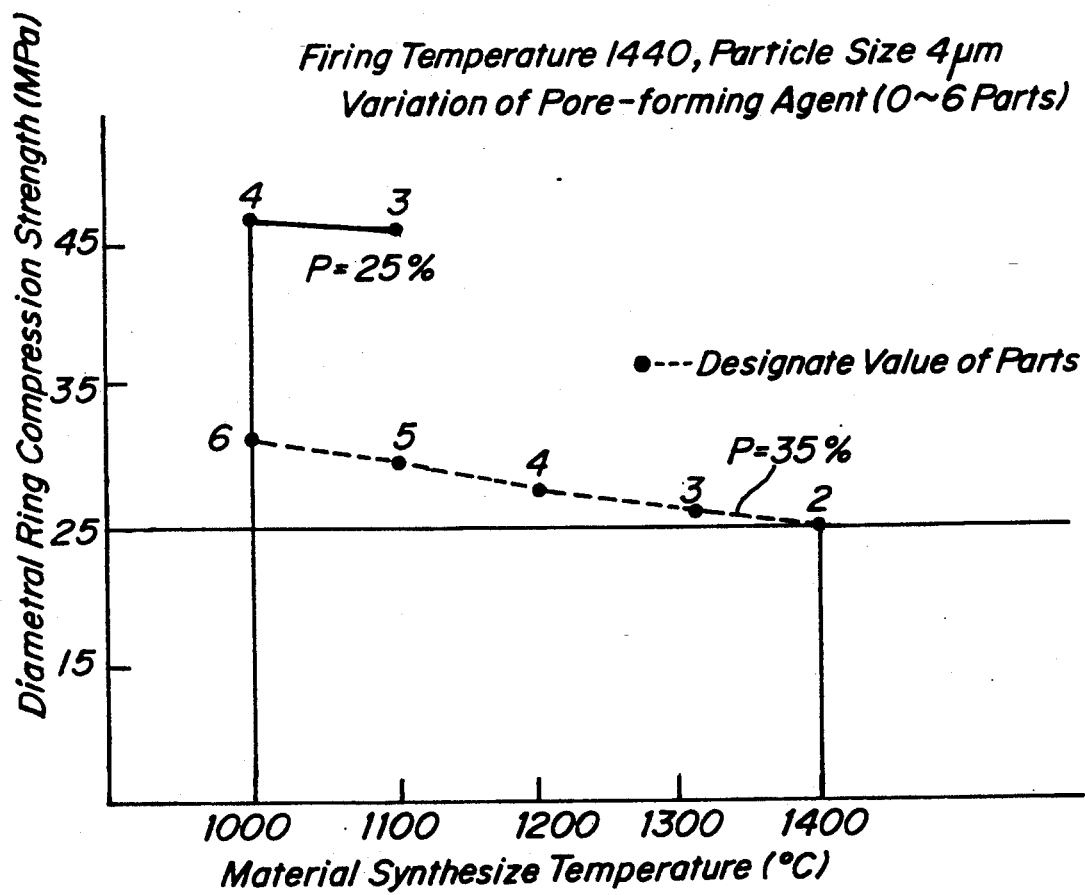

Powders of $La_2O_3$, $Mn_3O_4$ and $SrCO_3$ were mixed at a weight ratio of 61.7:32.1:6.2 in a ball mill, the mixture was dried and thereafter fired at each material synthesizing temperature shown in FIG. 2, and $La_{0.9}Sr_{0.1}MnO_3$ was synthesized. Thereafter, the synthesized $La_{0.9}Sr_{0.1}MnO_3$ powder was ground in a ball mill to a mean particle diameter of 4 $\mu m$. To 100 parts by weight of this powder were added 0-5 parts by weight of a pore-forming agent and an organic binder. The mixture of materials was then kneaded with the addition of 18 parts by weight of water, and formed, by extrusion, into a cylinder of 20 mm in outer diameter, 300 mm in length and 2 mm in thickness. Thereafter, the cylinder was subjected to moisture-conditioning and dried, then fired at a temperature of 1440° C. Moreover, the additional amount of a pore-forming agent was suitably set up for making porosities of each porous ceramic tube 25% or 35%, and diametral ring compression strength (n=8) of each example was measured. The result are shown in FIG. 2.

In FIG. 2, numerals on each line show additional amounts of a pore-forming agent at a synthesizing temperature of not more than 1000° C., wherein the material $La_{1-x}Sr_xMnO_3$ could not be synthesized. In order to manufacture a porous ceramic tube having more than 25% of porosity and more than 25 MPa of diametral ring compression strength, it is necessary to use a synthesizing temperature of $La_{1-x}Sr_xMnO_3$ less than 1400° C.

EXAMPLE 3

The powder of $La_2O_3$, $Mn_3O_4$ and $SrCO_3$ were mixed at a weight ratio of 61.7:32.1:6.2 in a ball mill, and this mixture was dried, thereafter fired at 1200° C. and $La_{0.9}Sr_{0.1}MnO_3$ was synthesized. Thereafter, the synthesized $La_{0.9}Sr_{0.1}MnO_3$ powder was ground in a ball mill to a mean particle diameter of 5 $\mu m$. To 100 parts by weight of the powder were added each additional amount of a pore-forming agent and an organic binder shown in FIG. 3.

The mixture of materials was then kneaded with the addition of 18 parts by weight of water, and then formed, by extrusion, into a cylinder of 20 mm in outer diameter, 300 m in length and 2 mm in thickness. Thereafter, the cylinder was subject to moisture conditioning and dried, and then fired to make the porosity of each substrate 25% or 35% by variously changing a firing temperature, and the diametral ring compression strength (n=8) of each example was measured. The results are shown in FIG. 3.

In this embodiment, when an additional amount of the pore-forming agent is increased, it is necessary to raise the sintering temperature for maintaining the same porosity. Moreover, even if the additional amount of the pore-forming agent is the same, if the sintering temperature is raised, the porosity becomes small. Therefore, the porosity is regulated by the additional amount of pore-forming agent and the sintering temperature.

Figure 3:
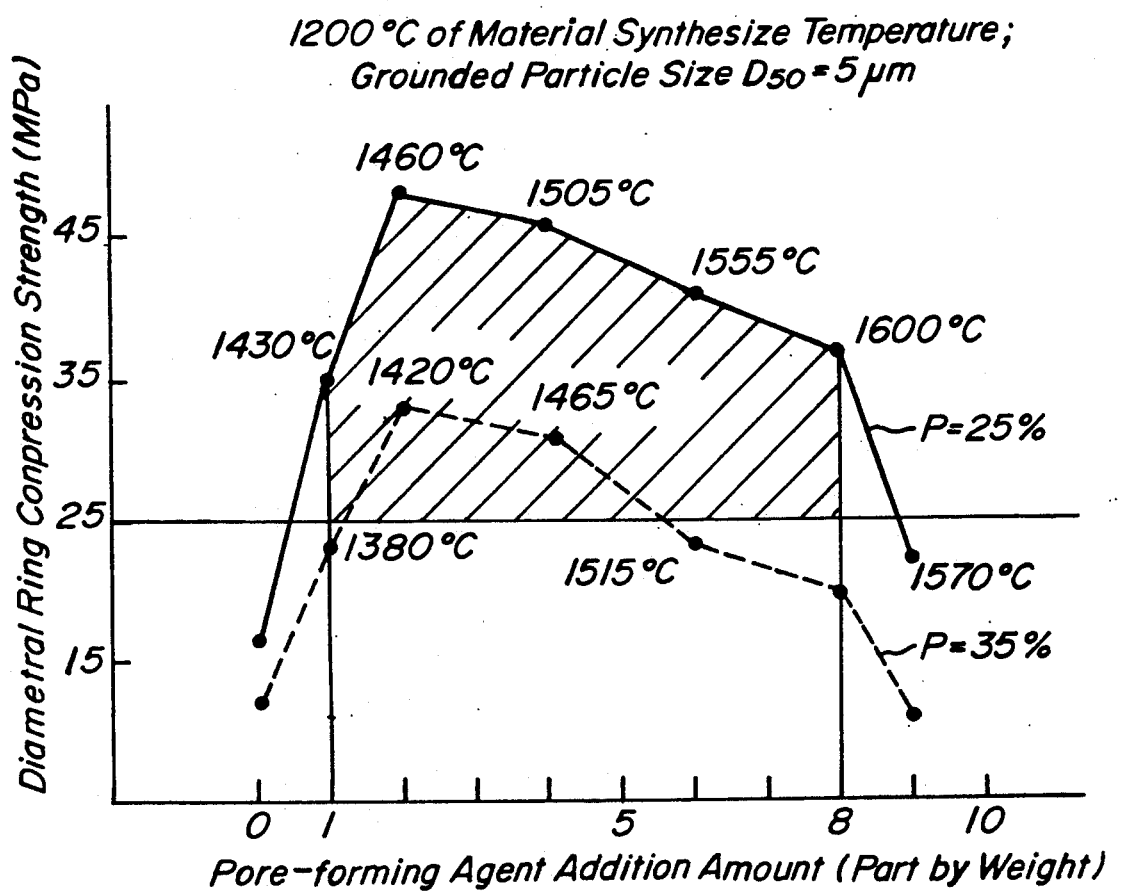

As understood from FIG. 3, in order to make the porosity P more than 25% and the diametral ring compression strength more than 25 MPa, the additional amount of the pore-forming agent may preferably be 1-8 parts by weight. When the additional amount of the pore forming agent is 2-5 parts by weight, the porosity P can be 35% and the diametral ring compression strength more than 25 MPa, which is further advantageous.

Although the invention has been described with a certain degree of particularity, it is understood that the present disclosure has been made only by way of example and that numerous changes in details of construction and the combination and arrangement of means may be resorted to without departing from the scope of the invention as hereinafter claimed.

What is claimed is:

1. A method of manufacturing a conductive porous ceramic tube having a porosity of 25-35% and a diametral ring compression strength of at least 25 MPa, said method comprising the steps of:

mixing powders or La or a La compounds, Mn or a Mn compound Sr or a Sr compound to form a mixture;

firing the mixture at a temperature of 1000°-1400° C. to synthesize a compound of $La_{1-x}Sr_xMnO_3$, wherein $0 < x \leq 0.5$;

grinding the compound of $La_{1-x}Sr_xMnO_3$ to form a powder having a mean particle diameter of 2-10 microns;

kneading 100 parts by weight of the powder with the addition of an organic binder, water and 1-8 parts by weight of a pore-forming agent to form a kneaded material;

forming the kneaded material into a molded tube;

drying the molded tube; and firing the molded tube at a temperature of 1300°-1600° C.

2. The method of claim 1, wherein said compound is synthesized by firing at a temperature of 1000°-1200° C.

3. The method of claim 1, wherein said molded tube is fired at a temperature of 1350°-1450° C.

4. The method of claim 1, wherein said organic binder is polyvinyl alcohol.

5. The method of claim 1, wherein said powders comprise $La_2O_3$, $Mn_3O_4$, and $SrCO_3$.

6. The method of claim 5, wherein said powders of $La_2O_3$, $Mn_3O_4$, and $SrCO_3$, are mixed at a weight ration of 61.7:32.1:6.2.

7. The method of claim 1, wherein said water is present in an amount of 18 parts by weight.

8. The method of claim 1, wherein said synthesized compound comprises $La_{0.9}Sr_{0.1}MnO_3$.

9. The method of claim 1, wherein said pore-forming agent is present in an amount of 2-5 parts by weight.

* * * * *